United States Patent
Caule et al.

(10) Patent No.: US 12,345,601 B2
(45) Date of Patent: Jul. 1, 2025

(54) METHOD AND SYSTEM FOR DETERMINING ONE OR MORE DEFECTS IN A ROTATING MACHINE OF AN AIRCRAFT

(71) Applicant: SAFRAN VENTILATION SYSTEMS, Blagnac (FR)

(72) Inventors: Patrice Caule, Moissy-Cramayel (FR); Alexandre Edet, Moissy-Cramayel (FR)

(73) Assignee: SAFRAN VENTILATION SYSTEMS, Blagnac (FR)

( * ) Notice: Subject to any disclaimer, the term of this patent is extended or adjusted under 35 U.S.C. 154(b) by 223 days.

(21) Appl. No.: 18/257,223

(22) PCT Filed: Dec. 9, 2021

(86) PCT No.: PCT/EP2021/084909
§ 371 (c)(1),
(2) Date: Jun. 13, 2023

(87) PCT Pub. No.: WO2022/128717
PCT Pub. Date: Jun. 23, 2022

(65) Prior Publication Data
US 2024/0027302 A1    Jan. 25, 2024

(30) Foreign Application Priority Data

Dec. 15, 2020 (FR) .................................... 2013249

(51) Int. Cl.
*G01M 15/14* (2006.01)
*B64F 5/60* (2017.01)

(52) U.S. Cl.
CPC .............. *G01M 15/14* (2013.01); *B64F 5/60* (2017.01)

(58) Field of Classification Search
CPC .................................. B64F 5/60; G01M 15/14
See application file for complete search history.

(56) References Cited

U.S. PATENT DOCUMENTS

2016/0305844 A1\* 10/2016 Ochsenfeld ............. G01M 7/00
2018/0017961 A1\*  1/2018 Bense ...................... G07C 3/00
(Continued)

FOREIGN PATENT DOCUMENTS

| EP | 2693176 A1 | 2/2014 |
|---|---|---|
| FR | 2952177 A1 | 5/2011 |
| WO | 2018/222341 A1 | 12/2018 |

OTHER PUBLICATIONS

International Search Report from corresponding International Application No. PCT/EP2021/084909 dated Feb. 4, 2022, 2 pages.

*Primary Examiner* — Eric S. McCall
(74) *Attorney, Agent, or Firm* — RANKIN, HILL & CLARK LLP

(57) ABSTRACT

A method for determining one or more faults of an aircraft rotating machine. The method comprising a step of measuring at least one acoustic signal and at least one vibratory signal during a same operating phase of the rotating machine, a step of transforming each signal into an acoustic frequency spectrum, a step of determining a set of frequencies of interest in the set of frequency spectra, a step of forming a base of fault spectra, each fault spectrum comprising at least one frequency line, each frequency line being obtained by linear combination of frequencies of interest with predetermined weighting coefficients, a comparison step in order to obtain a score, and a step of determining faults of the rotating machine by analyzing the scores obtained.

12 Claims, 4 Drawing Sheets

(56) References Cited

U.S. PATENT DOCUMENTS

2021/0063276 A1\* 3/2021 Abboud ................. G01H 1/003
2022/0365239 A1\* 11/2022 Rose ....................... E21B 43/26
2024/0366929 A1\* 11/2024 Boilson ............... A61M 60/232

\* cited by examiner

METHOD AND SYSTEM FOR DETERMINING ONE OR MORE DEFECTS IN A ROTATING MACHINE OF AN AIRCRAFT

TECHNICAL FIELD

The present invention relates to the field of fault monitoring of an aircraft rotating machine. The invention especially applies to a rotating machine comprising at least one piece of electrical equipment, in particular an electric motor.

In a known manner, a rotating machine is equipped with different sensors in order to determine known faults of a rotating machine. For example, a vibration sensor can be used to determine imbalance, an acoustic sensor can be used to determine a fault of a rolling bearing, or an electrical sensor can be used to detect an electrical fault of an electrical power generator of the rotating machine.

The use of such sensors is robust to determine a "simple" fault, that is having a single cause and a single effect. In practice, a fault in a rotating machine can affect, to a low degree, many components of the rotating machine (several effects). Such a "complex" or "distributed" fault is more difficult to determine given that it is difficult to identify by one of the sensors. The same applies to the combination of "pure" or "complex" faults (several causes). One of the objectives of the present invention is to make it possible to detect all faults which may occur simultaneously or which may have multiple, that is vibratory, acoustic or electrical, manifestations.

By way of example, by frequency analysis, a periodical fault having a first frequency which may correspond to an unbalance of a shaft of the rotating machine and another electrical fault having a second frequency with a value close to the first frequency may be observed. It is difficult for an operator to determine whether they are faced with a single fault or with two different faults.

In practice, to process the measurement of a sensor, it is known to determine the frequency spectrum, particularly by a Fourier transform, in order to check the presence of a possible signature at the characteristic frequencies of the machine. Such a determination is difficult at high frequency given that the spectrum is spread and it is difficult to isolate the signature accurately from a fault. This inaccuracy causes inaccuracy in fault diagnosis. This determination is difficult on strong signals (very pronounced faults) but is even more difficult on latent signals (slightly pronounced faults) which are then confused with broadband noise or with very close spectral lines. Conventionally, the presence/severity of a fault is not determined accurately but estimated over a frequency range, making it impossible to determine separately two faults having overlapping frequency ranges.

There is a need to early and reliably identify faults whether pure, complex, independent or combined, in a rotating machine.

In prior art, from patent applications WO2018/222341A1 EP2693176A1 and FR2952177A1, methods for determining faults of a rotating machine are known.

SUMMARY

The invention relates to a method for determining one or more faults of an aircraft rotating machine, the method comprising:
- a step of measuring at least one acoustic signal and at least one vibratory signal during a same operating phase of the rotating machine,
- a step of transforming each acoustic signal and each vibratory signal respectively into an acoustic frequency spectrum and a vibratory frequency spectrum so as to obtain a set of frequency spectra,
- a step of determining a set of frequencies of interest in the set of frequency spectra, each frequency of interest belonging to a predetermined frequency range,
- a step of forming a base of fault spectra, each fault spectrum comprising at least one frequency line, each frequency line being obtained by linear combination of frequencies of interest with predetermined weighting coefficients,
- a step of comparing each frequency spectrum to each fault spectrum so as to obtain a score and
- a step of determining the fault(s) of the rotating machine by analyzing the scores obtained.

By virtue of the invention, the set of frequencies of interest is determined very accurately based on acoustic and vibratory signals. Due to the different nature of the signals, it is advantageous to avoid bias in one of the measurements. An accuracy of 0.1 Hz is obtained, which makes it possible to determine a frequency of interest accurately and not over a frequency range as in prior art. Thus, a base of fault spectra can be formed by linear combination of frequencies of interest which is relevant. Indeed, due to the accuracy of the frequencies of interest, the fault spectrum may comprise frequencies (lines) which are very close to each other and which are characteristic of particular faults. Since each frequency of interest is highly accurate, harmonics (multiple of one frequency of interest) are also accurately determined.

In addition, comparing each frequency spectrum to each fault spectrum provides a general overview of the importance of each fault. The tonal noise of a frequency spectrum can thus be easily processed to identify faults.

The heterogeneous nature of the faults listed in the base of fault spectra allows for high reliability and robustness. The method according to the invention makes it possible to determine strong faults but also hidden faults or latent faults. This allows an operator to determine causes of malfunction of a rotating machine, given that they have simultaneously information on the acoustic and vibratory component of each fault.

Preferably, each frequency of interest corresponds to a fundamental frequency.

Preferably, during the step of comparing a frequency spectrum to a determined fault spectrum so as to obtain a score, an elementary score in the frequency spectrum is calculated for each weighted frequency of interest of the fault spectrum determined and the score is determined from the set of elementary scores.

By virtue of the accuracy of the determination of each frequency of interest, it is possible to check whether each frequency line of a fault spectrum is present in the frequency spectrum. Such a comparison was not possible in prior art as the frequencies were known inaccurately. By virtue of the invention, if the fault spectrum comprises two frequency lines that are close to a few Hz, two independent elementary scores are measured, which improves the relevance of determining the fault.

Preferably, the aircraft rotating machine comprising at least one piece of electrical equipment, the method comprises:
- a step of measuring at least one acoustic signal, at least one electrical signal and at least one vibratory signal during a single operating phase of the rotating machine, and a step of transforming each acoustic signal, each electrical signal and each vibratory signal respectively into an acoustic frequency spectrum, an electrical frequency spectrum and a vibratory frequency spectrum so as to obtain a set of frequency spectra.

The use of electrical signals in combination with vibratory signals and acoustic signals is relevant given that it allows distributed or combined faults to be revealed. More frequency spectra are obtained to improve accuracy upon determining a frequency of interest and to determine heterogeneous faults.

Preferably, the electrical signal is measured in the electrical equipment, preferably in an electric motor.

Preferably, during the step of determining a set of frequencies of interest, at least two frequency spectra being a function of at least one frequency of interest:
- a first estimate of the frequency of interest is determined in a first frequency spectrum,
- a second estimate of the frequency of interest is determined in a second frequency spectrum and
- the frequency of interest is determined from at least the first estimate of the frequency of interest and the second estimate of the frequency of interest.

By virtue of the invention, at least two frequency spectra are used to obtain independent estimates of a frequency of interest. This reduces inaccuracy in its determination, in particular by eliminating biases or pitfalls in interpreting the frequencies of interest. Preferably, the two frequency spectra are of different natures.

Preferably, the step of determining a set of frequencies of interest is performed from a link base that associates at least each frequency of interest with one or more frequency spectra. Such a link base makes it possible to determine in which frequency spectra a frequency of interest should be sought. Such a link base is preferably obtained by analytical calculations or feedback.

Preferably, the link base associates at least each frequency of interest with one or more frequency spectra with a weighting factor. A weighting factor makes it possible to calibrate relevance of a frequency of interest in a frequency spectrum. Thus, if the first frequency spectrum has a higher weighting factor than the second frequency spectrum, the first estimate of the frequency of interest will be taken into account more significantly in determining the frequency of interest. Thus, a frequency spectrum more representative of a frequency of interest is highlighted.

Preferably, each frequency of interest is sought in each frequency spectrum, each frequency of interest obtained being weighted according to the relevance of the frequency spectrum for said frequency of interest. Thus, all frequency spectra are used to limit biases. The higher the number of frequency spectra, the higher the accuracy.

According to one aspect of the invention, during the step of determining a set of frequencies of interest over the predetermined frequency range,
- a sliding average is calculated over a frequency spectrum by defining a window having a fixed predetermined value.
- the fixed sliding average of the frequency spectrum is removed to determine at least one peak corresponding to a frequency of interest.

The calculation of a fixed sliding average is fast and convenient when the peaks of the frequency spectrum are narrow (accurately defined), especially for low and medium frequencies.

According to another aspect of the invention, during the step of determining a set of frequencies of interest over the predetermined frequency range,
- the most emerging peaks of a frequency spectrum are detected,
- for each peak, its width is measured at its frequency to form a sample,
- a linear regression is performed from the samples so as to determine the course of the width of the peaks as a function of the frequency,
- a sliding average over the frequency spectrum is calculated by defining a window having a variable value determined from the linear regression,
- the variable sliding average of the frequency spectrum is removed to determine at least one peak corresponding to a frequency of interest.

The calculation of a variable sliding average, which is a function of the course of peak width as a function of frequency, allows all noise to be removed effectively to highlight the peaks in the frequency spectrum, especially for high frequencies.

The invention also relates to a system for determining one or more faults of an aircraft rotating machine, the system comprising:
- at least one acoustic sensor and at least one vibratory sensor configured to measure at least one acoustic signal and at least one vibratory signal respectively during a same operating phase of the rotating machine,
- at least one calculator configured to:
  - transform each acoustic signal and each vibratory signal respectively into an acoustic frequency spectrum and a vibratory frequency spectrum so as to obtain a set of frequency spectra,
  - determine a set of frequencies of interest in the set of frequency spectra, each frequency of interest belonging to a predetermined frequency range,
  - form a base of fault spectra, each fault spectrum comprising at least one frequency line, each frequency line being obtained by linear combination of frequencies of interest with predetermined weighting coefficients,
  - compare each frequency spectrum with each fault spectrum to obtain a score and
  - determine one or more faults of a rotating machine by analyzing the scores obtained.

The invention also relates to an aircraft rotating machine comprising a system as previously set forth. In other words, the fault determination method can be implemented onboard.

DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention if necessary.

DETAILED DESCRIPTION

The invention relates to a rotating machine for an aircraft, in particular an airplane or helicopter. The invention will be set forth in particular for a rotating machine that comprises electrical equipment, in particular, an electric motor that draws mechanical energy from at least one shaft of the rotating machine. It goes without saying that the invention also applies to a rotating machine devoid of electrical equipment.

By rotating machine, it is meant any one of a turbine, a rotating motor, a generator, a pump, a reduction gear, a stirrer, a reactor, a compressor, a gearbox, a fan, a turbomachine, a turbocharger or the like.

Figure 1:
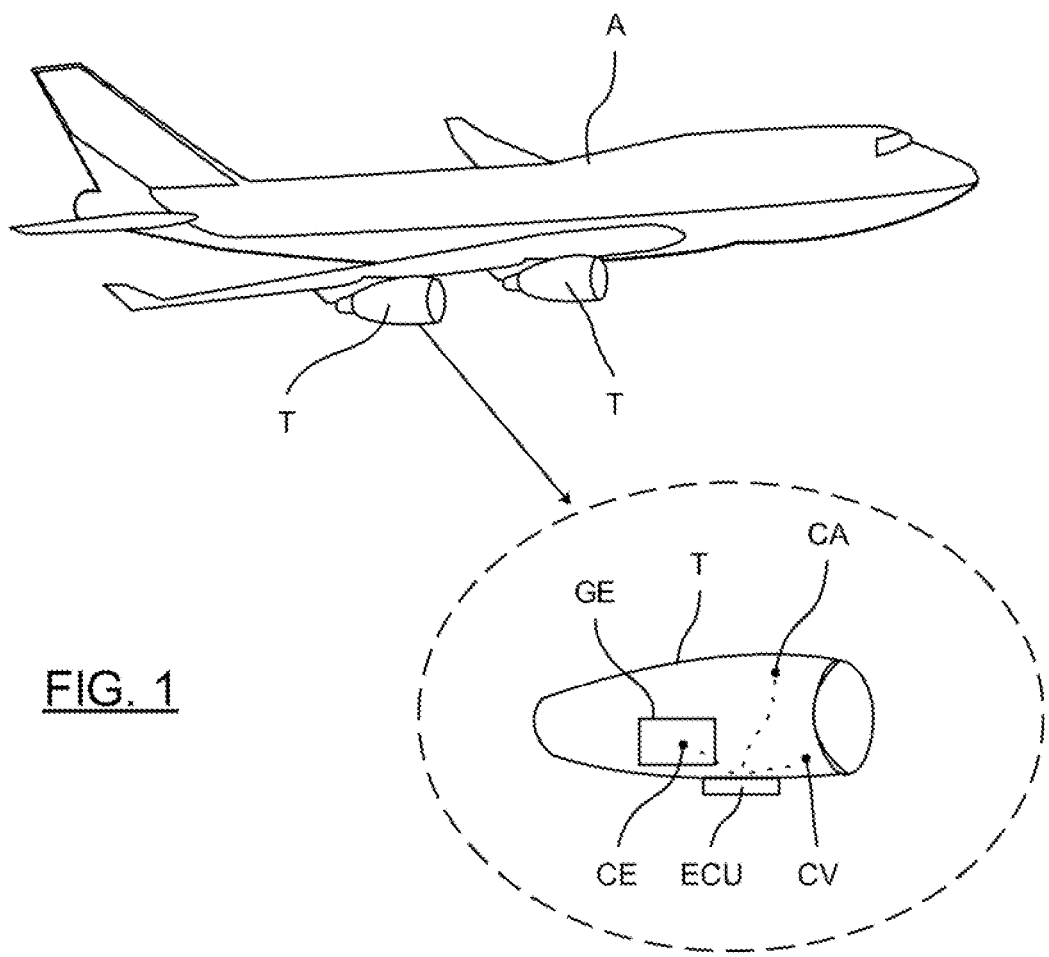
FIG. 1 is a schematic representation of an aircraft comprising rotating machines equipped with sensors of different natures.

With reference to FIG. 1, an aircraft A equipped with two rotating machines T, in particular turbine engines, is represented. In this example, each rotating machine T comprises a plurality of measurement sensors, in particular, at least one electrical sensor CE, at least one acoustic sensor AC, and at least one vibratory sensor CV. The rotating machine T comprises an electric generator GE comprising at least one stator member and at least one rotor member rotatably mounted in relation to the stator member. The rotor member has a fixed number of poles.

In the example in FIG. 1 for the sake of clarity and brevity, only one sensor of each type is represented, but it goes without saying that they could be more numerous. Subsequently, with reference to FIG. 3, the sensors CE, CA. CV are configured to acquire measurements, in particular, a number i (i being a natural integer) of acoustic signals $A_i$, a number j (j being a natural integer) of electrical signals $E_j$ and a number k (k being a natural integer) of vibratory signals $V_k$.

Preferably, each acoustic sensor $CA_i$ is configured to measure a single acoustic signal $A_i$ and the same applies to each electrical sensor $CE_j$ and each vibratory sensor $CV_k$ to measure a single electrical signal $E_j$ and a single vibratory signal $V_k$ respectively.

Preferably, the signals $A_i$, $E_j$, $V_k$ are stored in a computer memory during aircraft flights to be processed later, particularly on the ground. Alternatively, the aircraft comprises an on-board calculator for processing the signals $A_i$, $C_j$, $V_k$ in real time.

With reference to FIG. 1, the rotating machine T comprises at least one calculator ECU configured to perform several calculation functions upon implementing the method, in particular:
- transform each acoustic signal, each electrical signal and each vibratory signal into an acoustic frequency spectrum, an electrical frequency spectrum and a vibratory frequency spectrum respectively in order to obtain a set of frequency spectra,
- determine a set of frequencies of interest in the set of frequency spectra, each frequency of interest belonging to a predetermined frequency range,
- form a base of fault spectra, each fault spectrum comprising at least one frequency line, each frequency line being obtained by linear combination of frequencies of interest with predetermined weighting coefficients,
- compare each frequency spectrum with each fault spectrum to obtain a score and
- determine one or more faults of the rotating machine T by analyzing the scores obtained.

These calculation steps will be set forth in detail later.

A method for determining faults of a rotating machine T will now be set forth with reference to FIG. 2, which schematically illustrates the steps ET1-ET6 of the method.

In this example, by virtue of the sensors CA, CE, CV, the method comprises a step of measuring ET1 acoustic signals $A_i$, electrical signals $E_j$ and vibratory signals $V_k$ during a same operating phase of the rotating machine T. The signals $A_i$, $E_j$, $V_k$ are time signals known to the skilled person.

Among the operating phases of a rotating machine T, this may be, in particular, a taxi, take-off, cruise or landing phase. An acquisition during a same phase makes it possible to characterize faults in a robust way, given that some faults are highlighted according to the mechanical, thermal or thermodynamic conditions of the rotating machine T.

Preferably, the signals $A_i$, $E_j$. $V_k$ are measured simultaneously to have a correlation with each other. This makes it easier to determine frequencies of interest as will be set forth later. Following their acquisition, the signals $A_i$, $E_j$, $V_k$ are noisy (wide band noise) due to the context of use of the rotating machine T, which are hence difficult to use as such. Furthermore, individually, the tonal noise of each signal (fundamental frequencies and harmonics) is difficult to determine.

Figure 2:
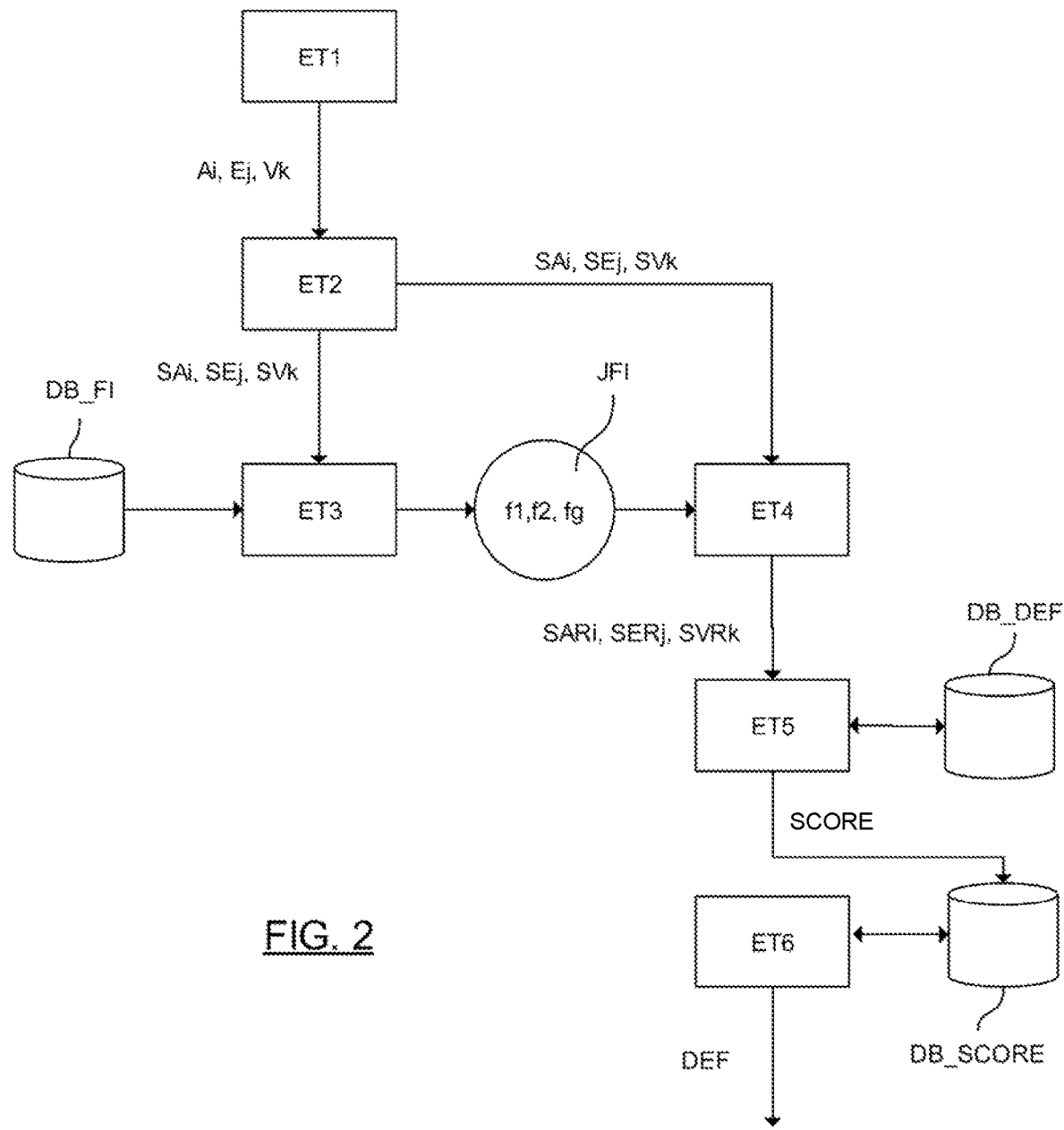
FIG. 2 is a schematic representation of the steps of a method for determining faults according to an exemplary implementation of the invention.

With reference to FIG. 2, the method comprises a step of transforming ET2 the signals $A_i$, $E_j$, $V_k$ into frequency spectra $SA_i$, $SE_j$, $SV_k$. In other words, the method comprises a transformation of each acoustic signal $A_i$, each electrical signal $E_j$ and each vibratory signal $V_k$ into an acoustic frequency spectrum $SA_i$, an electrical frequency spectrum $SE_j$ and a vibratory frequency spectrum $SV_k$ respectively so as to obtain a set of frequency spectra. Such a transformation in the frequency domain is preferably carried out by a Fourier transformation, but it goes without saying that it could be carried out in a different way.

In a known manner, a frequency spectrum comprises primary data (tonal noise) that correspond to fundamental and harmonic frequencies as well as secondary data (wideband noise, related equipment) that noise the primary data.

According to the invention, with reference to FIG. 2, the method comprises a step of determining ET3 a set of frequencies of interest JFI in the set of frequency spectra $SA_i$, $SE_j$, $SV_k$.

Preferably: the set of frequencies of interest JFI comprises frequencies of interest $f_1$, $f_2$, $f_g$ (g being a natural integer) which are predetermined for each rotating machine T and which belong to predetermined frequency ranges $PF_g$ respectively.

In this example, the rotating machine T is a two-spool machine and comprises a low-pressure shaft, a high-pressure shaft, a low-pressure compressor, a high-pressure compressor, a combustion chamber, a high-pressure turbine and a low-pressure turbine.

At least one frequency spectrum is a function of at least one frequency of interest, preferably several frequencies of interest. Advantageously, with reference to the figure, there is a link base DB_FI that associates with each frequency of interest $f_g$, one or more frequency spectra SAL $SE_j$, $SV_k$.

By way of example, the first acoustic spectrum SA1 comprises a first frequency of interest $f_1$ which corresponds to the rotational frequency of the low pressure shaft while the first electrical spectrum SE1 comprises the first frequency of interest f1 but also a second frequency of interest f2 which corresponds to a frequency of a rotor member of the electric generator. The first vibratory spectrum SV1 also comprises the second frequency of interest f2. This example is for illustrative purposes only and it goes without saying that the combinations between frequency spectra and frequencies of interest could be diverse.

In other words, each frequency of interest is associated with one or more frequency spectra. One or more frequencies of interest fg may appear clearly in a frequency spectrum (frequency having significant amplitude and/or far from other frequencies). Conversely, other frequencies of interest may be more difficult to determine (frequency having low amplitude, presence of noise and/or close to other frequencies).

Preferably, the link base DB_FI associates each frequency of interest fg with one or more frequency spectra with a weighting factor δ. In this example, the link base DB_FI comprises for each frequency of interest f1, f2 at least one frequency spectrum SA1, SE1. SV1 associated with a weighting factor δ. Preferably, the link base DB_FI comprises a theoretical value of each frequency of interest f1, f2, which facilitates the determination thereof in the frequency spectra by defining a search window (determined frequency range).

In this example, the link base DB_FI comprises the following associations.

f1: [SA1;δ1]; [SE1;δ2] for the frequency range PF1
f2: [SE1;δ3]; [SV1;δ4] for the frequency range PF2

For each predetermined frequency of interest f1, f2, the frequency is searched for in the frequency spectra associated. In this example, the first predetermined frequency of interest f1 is sought, on the one hand, in the first acoustic frequency spectrum SA1 so as to obtain a first estimated frequency f1e1 associated with a first weighting factor δ1, and, on the other hand, in the first electrical frequency spectrum SE1 so as to obtain a second estimated frequency f1e2 associated with a second weighting factor δ2.

To determine the first predetermined frequency of interest f1, a weighted calculation is performed based on the estimated frequencies f1e1, f1e2 and the weighting factors δ1, δ2. In this example, the first weighting factor δ1 is greater than the second weighting factor δ2 and as a result, the first estimated frequency f1e1 is more taken into account than the second estimated frequency f1e2 to determine the predetermined frequency of interest f1. Any mathematical weighting function may be implemented, in particular, a weighted average.

Advantageously, searching for a frequency of interest on several frequency spectra enables inaccuracy to be limited. This inaccuracy is low as the frequency spectra are of different natures. Therefore, spectra do not benefit from a same measurement bias, which is advantageous. Preferably, a frequency of interest is associated with each frequency spectrum with a weighting factor.

Preferably, each frequency of interest corresponds to a fundamental frequency of tonal noise.

Preferably, to determine a predetermined frequency of interest at low and medium frequency, a sliding average is calculated over the frequency spectrum by defining a window having a predetermined fixed value. This sliding average is removed from the frequency spectrum to highlight the peaks. Such a method is effective when the peak width is almost constant over the entire frequency spectrum.

At high frequency, when the width of the peaks increases, in the spectrum, the most emerging peaks of the frequency spectrum are detected, then its width at its frequency is measured for each peak to form a sample.

Then, a linear regression is performed from the samples to determine the course of the width of the peaks as a function of the frequency. Advantageously, a polynomial, preferably linear polynomial, is obtained.

Thus, a sliding average over the frequency spectrum can be calculated by defining a window having a variable value determined from the linear regression, in particular, of the polynomial obtained. The rolling average is no longer fixed but varies over the frequency range in proportion to the width of the peaks. The sliding average is then removed from the frequency spectrum to highlight the peaks and therefore the frequencies of interest.

Following the determination step ET3, a set of frequencies of interest JFI comprising a plurality of frequencies of interest fg accurately determined is advantageously available.

Figure 3:
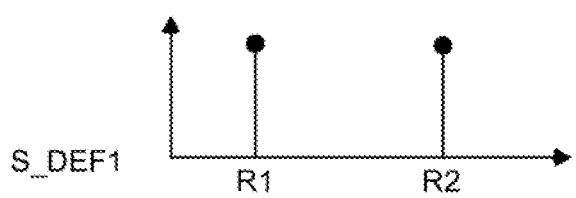
FIG. 3 is another schematic representation of three fault spectra with their lines.
Figure 3:
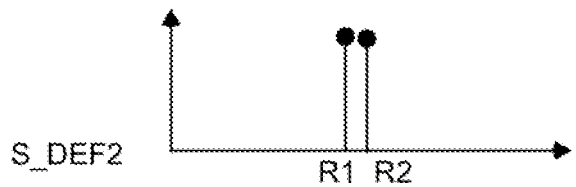

With reference to FIGS. 2 and 3, the method comprises a step of forming a base of fault spectra DB_DEF, each fault spectrum S_DEFm being obtained by linear combination of frequencies of interest fg having predetermined weighting coefficients αg, μg. Preferably, the weighting coefficients αg and βg are determined based on feedback.

Each fault spectrum is in the form of a set of frequencies, that is a frequency distribution. Preferably, each fault spectrum is in the form of a weighted Dirac comb.

According to the invention, each fault spectrum S_DEFm comprises at least one frequency line, each frequency line corresponding to a linear combination of frequencies of interest fg having predetermined weighting coefficients. Such an approach is relevant when frequencies of interest fg are accurately determined. A linear combination makes it possible to highlight phenomena of interaction between the various frequencies of interest in a rotating machine (slipping phenomenon).

By way of example, for two frequencies of interest f1, f2, with reference to FIG. 3, three fault spectra S_DEF1, S_DEF2, S_DEF3 with predetermined weighting coefficients α, β are determined:

$$S\_DEF1=R1(\alpha 11 \times f1 + \beta 11 \times f2) + R2(\alpha 12 \times f1 + \beta 12 \times f2)$$

$$S\_DEF2=R1(\alpha 21 \times f1 + \beta 21 \times f2) + R2(\alpha 22 \times f1 + \beta 22 \times f2)$$

$$S\_DEF3=R1(\alpha 31 \times f1 + \beta 31 \times f2) + R2(\alpha 32 \times f1 + \beta 32 \times f2)$$

For the sake of clarity, only two lines were represented per fault spectrum, but it goes without saying that their number could be different. Due to the accuracy of the frequencies of interest f1, f2, each ray is accurately determined. As illustrated in FIG. 3, the lines R1, R2 are far for the fault spectra S_DEF1 and S_DEF3 but close for the fault spectrum S_DEF2.

With reference to FIGS. 2 and 3, the method comprises a step of comparing ET5 each frequency spectrum SAi, SEj, SVk with each fault spectrum S_DEFm in order to obtain a score SCORE.

During the step of comparing a frequency spectrum SAi, SEj, SVk with a fault spectrum S_DEFm determined in order to obtain a score SCORE, an elementary score SCORE_E in the frequency spectrum SAi, SEj, SVk is calculated for each frequency line of the fault spectrum S_DEFm determined and the score SCORE is determined from the set of elementary scores SCORE_E. In particular, the tonal wide band height of the lines is read out.

Figure 4A:
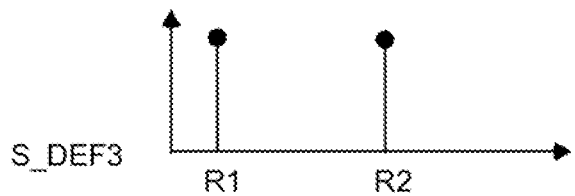
FIG. 4A is a schematic representation of the comparison of a first acoustic spectrum with the lines of a first fault spectrum.
Figure 4A:
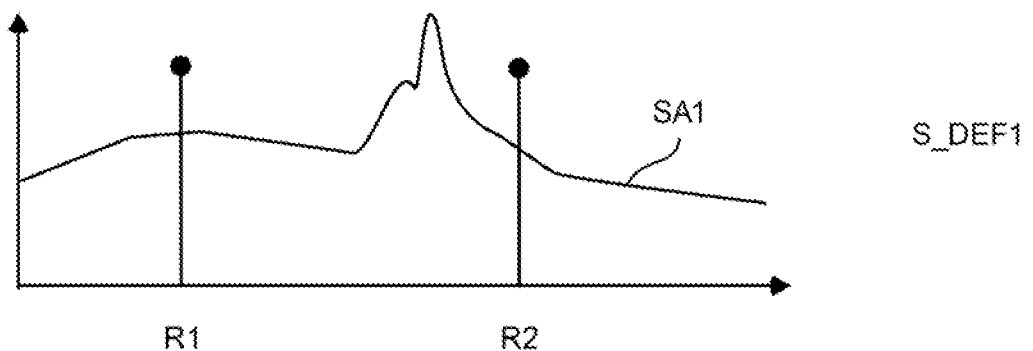

By way of example, with reference to FIG. 4A, a frequency spectrum SA1 is compared with the first fault spectrum S_DEF1 and the energy associated with each frequency line R1, R2 in the frequency spectrum SA1 is measured in order to obtain two elementary scores SCORE_E1, SCORE_E2. In this example, the frequency spectrum SA1 is represented as a continuous curve but it could be in the form of lines. In this example, to form the score SCORE for the first fault spectrum S_DEF1, a sum of the elementary scores SCORE_E1, SCORE_E2 is simply made but it goes without saying that other mathematical calculations could be implemented. In this example, the elementary scores SCORE_E1, SCORE_E2 are low (even null).

Figure 4B:
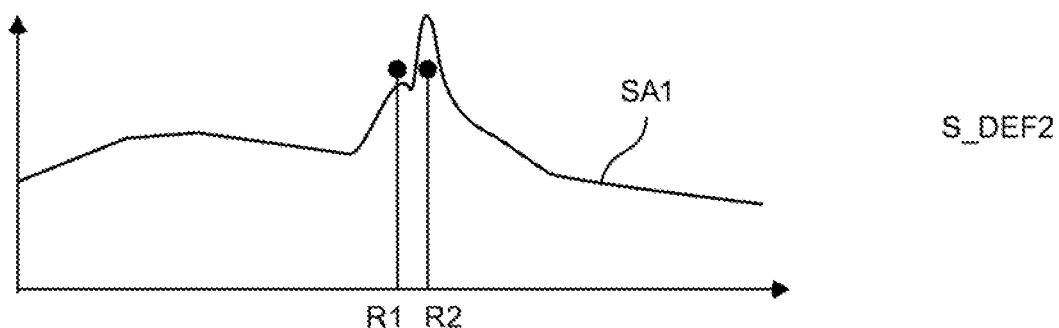
FIG. 4B is a schematic representation of the comparison of a first acoustic spectrum with the lines of a second fault spectrum.
Figure 5:
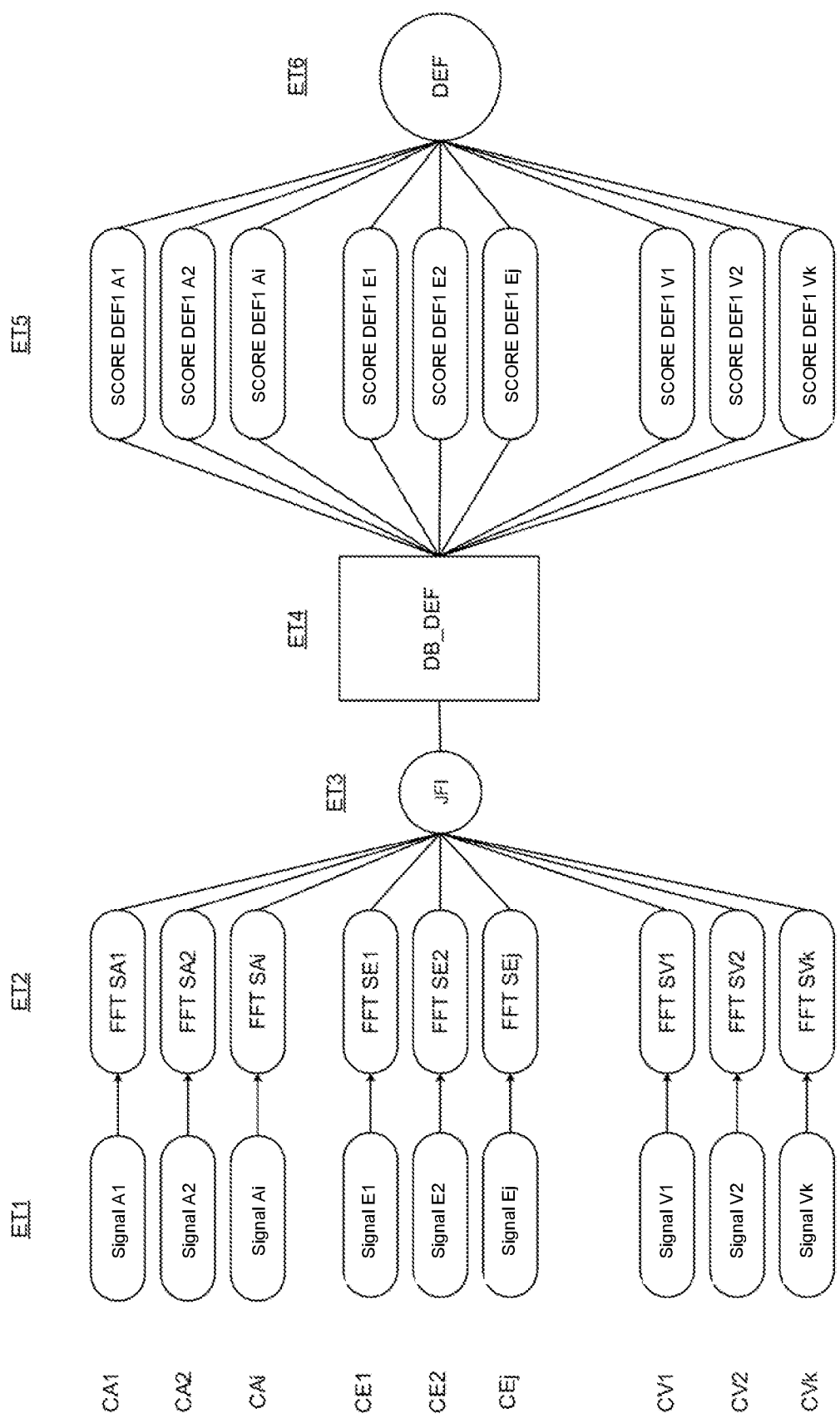
FIG. 5 is another schematic representation of the steps of a method for determining faults according to an exemplary implementation of the invention.

Similarly, with reference to FIG. 4B, the same frequency spectrum SA1 is compared with the second fault spectrum S_DEF2 which comprises frequency lines R1, R2 which are close to each other. Advantageously, a high score is obtained as each frequency line is considered independently, which was not possible with a method of prior art in which only energy over a frequency range was measured. In FIG. 4B, there are two elementary scores SCORE_E1, SCORE_E2 of significant value and a medium overall score SCORE.

For example, the fault base DB_DEF comprises 4 identified faults DEF1, DE2, DEF3, DEF4. In this example, a following score base DB_SCORE in which a score is low, medium or high is obtained.

TABLE 1

|  | DEF1 | DEF2 | DEF3 | DEF4 | DEF5 |
| --- | --- | --- | --- | --- | --- |
| SA1 | Low | Medium | Low | Low | High |
| SE1 | Low | Low | Low | Low | Low |
| SV1 | Low | Medium | Low | Low | Low |

The method comprises a step of determining ET6 the fault(s) of the rotating machine by analyzing the scores associated with the faults in the score base DB_SCORE in order to determine the most probable faults. In the present example, the fault DEF5 is a strong acoustic fault as it is visible only on the first acoustic spectrum SA1. The fault DEF2 is a latent fault that could have been interpreted as noise or a replica of the fault DEF5. Its characterization on the first acoustic spectrum SA1 and on the first vibratory spectrum SV1 makes it possible to determine it in a practical way.

By virtue of the invention, there is a global vision that makes it possible to detect low or hidden faults. In addition, a multi-criteria analysis makes it possible to better understand the origin of the malfunction. In this case, the fault DEF5 corresponds to a bearing fault and a simplistic analysis would lead to the conclusion that the bearing is faulty as such. By determining the fault DEF2 relating to a neighboring member, it can be concluded that there is a bearing mounting or installation fault, which bearing is not actually faulty as such.

Preferably, all the faults identified, associated with their frequency spectra, are stored in a knowledge base in order to be used later for predictive maintenance.

The invention claimed is:

1. A method for determining one or more faults of an aircraft rotating machine, the method comprising:
   a step of measuring at least one acoustic signal and at least one vibratory signal during a same operating phase of the rotating machine,
   a step of transforming the at least one acoustic signal and the at least one vibratory signal into an acoustic frequency spectrum and a vibratory frequency spectrum, respectively, in order to obtain a set of frequency spectra,
   a step of determining a set of frequencies of interest in the set of frequency spectra, each frequency of interest belonging to a predetermined frequency range,
   a step of forming a base of fault spectra, each fault spectrum of the fault spectra comprising at least one frequency line, the at least one frequency line being obtained by linear combination of the frequencies of interest with predetermined weighting coefficients,
   a step of comparing the frequency spectrum with the fault spectrum in order to obtain a score, and
   a step of determining the one or more faults of the rotating machine by analyzing the scores obtained.

2. The method according to claim 1, wherein, during the step of determining a set of frequencies of interest, at least two of the frequency spectra being a function of the at least one predetermined frequency of interest:
   a first estimate of the predetermined frequency of interest is determined in a first frequency spectrum,
   a second estimate of the predetermined frequency of interest is determined in a second frequency spectrum, and
   the predetermined frequency of interest is determined from at least the first estimate of the predetermined frequency of interest and the second estimate of the predetermined frequency of interest.

3. The method according to claim 1, wherein, during the step of determining a set of frequencies of interest over the predetermined frequency range,
   a sliding average is calculated over the frequency spectrum by defining a window having a fixed predetermined value, and
   a fixed sliding average of the frequency spectrum is removed to determine at least one peak corresponding to the frequency of interest.

4. The method according to claim 1, wherein, during the step of determining a set of frequencies of interest over the predetermined frequency range,
   the most emerging peaks of a frequency spectrum are detected,
   for each peak, its width is measured at its frequency to form a sample,
   a linear regression is performed from the samples so as to determine a course of the width of the peaks as a function of the frequency,
   a sliding average over the frequency spectrum is calculated by defining a window having a variable value determined from the linear regression, and
   the variable sliding average of the frequency spectrum is removed to determine at least one peak corresponding to the frequency of interest.

5. The method according to claim 1, wherein the step of determining a set of frequencies of interest is performed from a link base that associates the frequency of interest with one or more of the frequency spectra.

6. The method according to claim 5, wherein, the link base associates the frequency of interest with one or more of the frequency spectra with a weighting factor.

7. The method according to claim 1, wherein the aircraft rotating machine comprises at least one piece of electrical equipment, the method further comprising:
   a step of measuring the at least one acoustic signal, at least one electrical signal, and the at least one vibratory signal during the same operating phase of the rotating machine, a step of transforming the at least one acoustic signal, the at least one electrical signal, and the at least one vibratory signal into the acoustic frequency spectrum, an electrical frequency spectrum, and the vibratory frequency spectrum, respectively, so as to obtain the set of frequency spectra.

8. The method according to claim 7, wherein, during the step of comparing the frequency spectrum with a determined fault spectrum so as to obtain a score, an elementary score is calculated in the frequency spectrum for each weighted frequency of interest of the determined fault spectrum and the score is determined from the set of elementary scores.

9. The method according to claim 7, wherein the electrical signal is measured in the electrical equipment.

10. The method according to claim 9, wherein the electrical equipment is an electric motor.

11. A system for determining one or more faults of an aircraft rotating machine, the system comprising:
at least one acoustic sensor and at least one vibratory sensor configured to measure at least one acoustic signal and at least one vibratory signal, respectively, during a same operating phase of the rotating machine, at least one calculator (ECU) configured to:
transform the at least one acoustic signal and the at least one vibratory signal into an acoustic frequency spectrum and a vibratory frequency spectrum, respectively, in order to obtain a set of frequency spectra,
determine a set of frequencies of interest in the set of frequency spectra, each frequency of interest belonging to a predetermined frequency range,
form a base of fault spectra, each fault spectrum comprising at least one frequency line the at least one frequency line being obtained by linear combination of frequencies of interest with predetermined weighting coefficients,
compare each of the frequency spectrum with each of the fault spectrum in order to obtain a score and
determine the one or more faults of the rotating machine by analyzing the scores obtained.

12. An aircraft rotating machine comprising a system according to claim 11.

* * * * *